March 23, 1965 A. J. SPARLING ETAL 3,175,108
MOTOR DRIVE ASSEMBLY
Filed Feb. 14, 1963 3 Sheets-Sheet 1
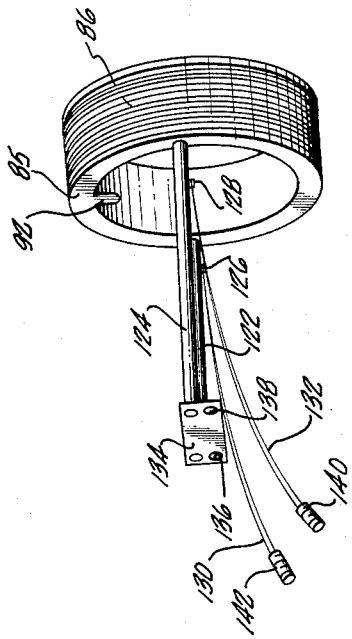
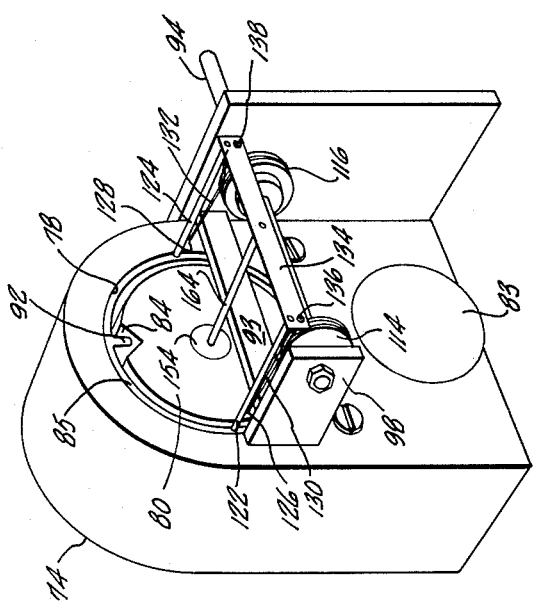
INVENTORS.
ARTHUR J. SPARLING
ARTHUR THOM
ALBERT THOMAS
BY Christie, Parker & Hale
ATTORNEYS.

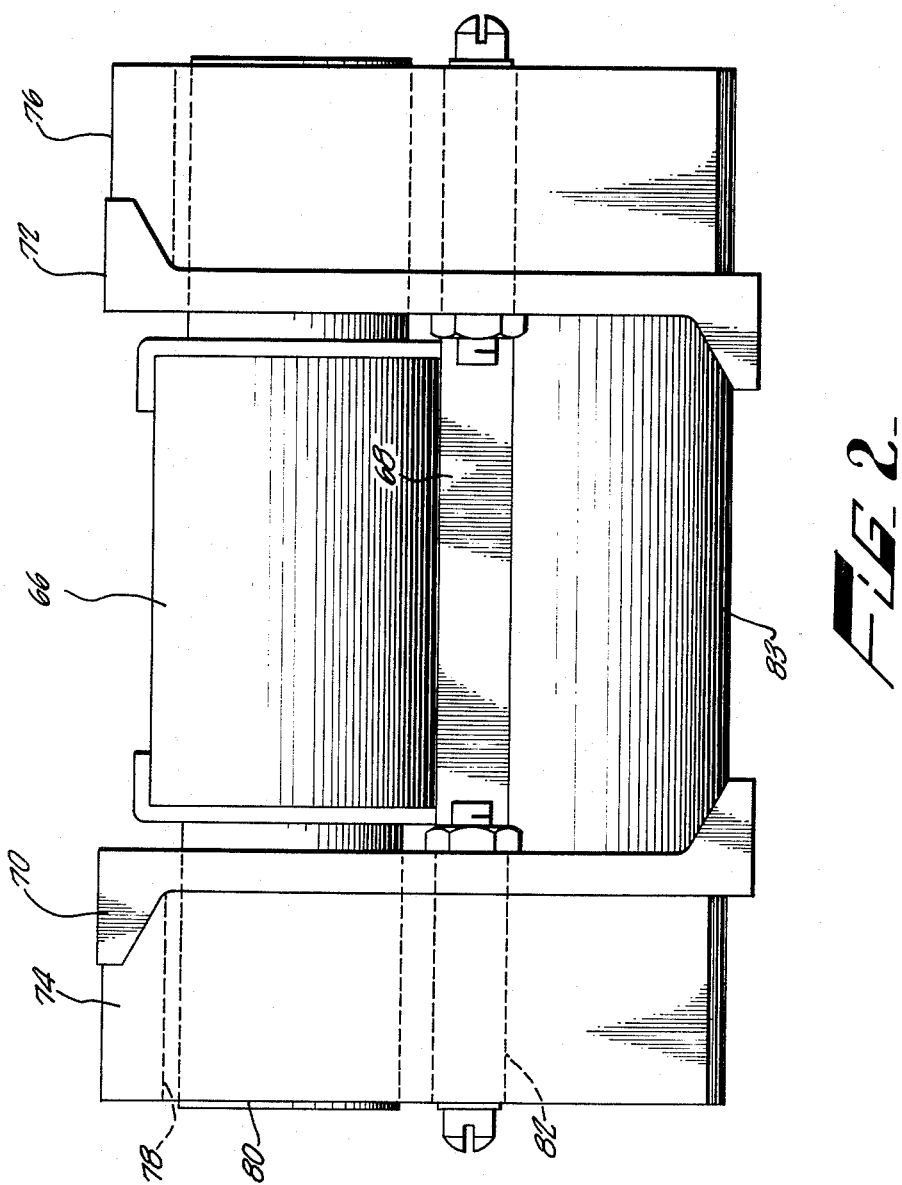

March 23, 1965 A. J. SPARLING ETAL 3,175,108
MOTOR DRIVE ASSEMBLY
Filed Feb. 14, 1963 3 Sheets-Sheet 3

INVENTORS.
ARTHUR J. SPARLING
ARTHUR THOM
ALBERT THOMAS
BY Christie, Parker & Hale
ATTORNEYS.

ated Mar. 23, 1965

3,175,108
MOTOR DRIVE ASSEMBLY
Arthur J. Sparling, Manhattan Beach, Arthur Thom, Inglewood, and Albert Thomas, Lawndale, Calif., assignors to Telautograph Corporation, Los Angeles, Calif., a corporation of California
Filed Feb. 14, 1963, Ser. No. 258,589
10 Claims. (Cl. 310—20)

The present invention relates to improvements in motor drives and, more particularly, to a novel motor drive assembly including a linear-to-rotary motion converter.

In position control systems it is generally desired to selectively control the movement and position of a movable member in response to variations in a position control input signal. Such control systems generally include a motor drive assembly coupled to the movable member for receiving the input signal. In response to the input signal the motor drive is energized to position the movable member in accordance with the value of the input signal.

Certain position control systems, such as telescriber systems, require an extremely rapid and linear response to changes in the magnitude of an input signal to accurately position and reposition a movable member. Due to the linearity of response required by such position control systems, conventional motor drive designs have proven somewhat unsatisfactory.

In view of the above, the present invention provides a relatively simple, inexpensive motor drive assembly which is highly stable in construction and extremely linear in its response to variations in an input control signal applied thereto.

Briefly, the motor drive assembly of the present invention comprises means for generating a magnetic field including a body of magnetic material. Included in an upper surface of the body is means defining a V-shaped groove extending longitudinally in a horizontal plane. Positioned around the body of magnetic material is a hollow movable bobbin. Wound around the bobbin is a coil for receiving a current signal. Current passing through the coil produces a force on the coil to move the bobbin in the direction of the V-shaped groove. To support the bobbin for movement along the direction of the groove a ball is positioned in the groove to make rolling contact with an upper inner surface of the bobbin and the sides of the groove.

In addition to the above, a motor drive assembly includes a linear-to-rotary motion converter which cooperates with the bobbin assembly to aid the ball and grove in providing support for the linear motion of the bobbin assembly. Basically, the linear-to-rotary motion converter includes a rotatable shaft mounted in a horizontal plane substantially normal to the direction of motion of the bobbin. The converter also includes first and second closed loop cable arrangements. Extending from the bobbin is a support means for securing the cables to extend in substantially straight lines from areas in a horizontal center plane of the bobbin equally spaced from a vertical plane including the groove. The cables extend away from the areas in the horizontal plane adjacent the bobbin about the shaft to thread the cable loops and to areas in the horizontal center plane equally spaced from the vertical plane. The cable arrangements are wound around the shaft such that like portions of the cables in passing around the shafts are equally spaced from vertical planes in line with the beginning and end areas of the cables. Preferably, the linear-to-rotary motion converter also includes means coupled to the cables for selectively controlling the tension in the cables.

Thus arranged, the motor drive assembly of the present invention provides a three point support of the coil-bobbin assembly for linear low friction movement within a magnetic field. The three points of support are defined by the point contact of the ball with the bobbin and the tangent points of the cables with the shaft. Such a three-point support is highly stable. In particular, by arranging the cables about the shaft such that like portions of the cable are equally spaced from vertical planes in line with the beginning and end areas of the cable, balanced opposing lateral forces are exerted on the shaft when the cables are longitudinally tensioned thereby eliminating any tendency for the cables to impart a rotary motion to the bobbin. Further, by tensioning the cables and providing a preloaded bearing support for the shaft the motor drive system is substantially free from undesired backlash during the positioning and repositioning of the bobbin assembly.

The above, as well as other features of the present invention, may be more clearly understood by reference to the following detailed description when considered with the drawings, in which:

FIGURE 1 is a schematic perspective representation of the movable coil and linear-to-rotary motion converter of the present invention;

FIGURE 2 is a schematic representation of the magnetic field configuration of the present invention;

FIGURE 3 is a schematic perspective representation of the coil-bobbin arrangement together with the means for supporting the cable arrangements of the present invention;

Figure 4:
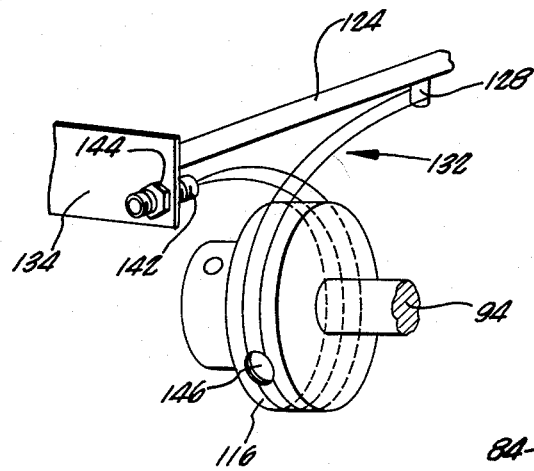
FIGURE 4 is a schematic perspective representation of the arrangement for wrapping a cable about the rotatable shaft.

As briefly described above, the motor drive system of the present invention is particularly adaptable to use in telescriber systems such as the system described in detail in the co-pending patent application Serial No. 258,-804, filed February 14, 1963, the subject thereof being incorporated herein by reference.

In the position control system described in said co-pending application it is necessary that the movement of the coil assembly 36 be highly linear and rapidly responsive to small changes in the value of the current signals passing through the coil 38. In addition, it is desired that the linear-to-rotary motion converter have a high efficiency of operation which does not adversely effect the linear response of the movable coil assembly 36.

The motor drive assembly of the present invention provides these and additional features and its preferred form is illustrated by the FIGURES 1-6.

As represented, the motor drive includes a magnetic field assembly illustrated in FIGURE 2. The magnetic field assembly comprises a permanent magnet 66 supported by platform member 68. The platform member 68, in turn, is coupled to a pair of vertically extending support bracket assemblies 70 and 72. The support bracket assemblies 70 and 72 extend in vertical planes along opposite ends of the permanent magnet 66. The support bracket assemblies each provide vertical support for end members of magnetic material 74 and 76, respectively. The end members 74 and 76 are substantially the same. Therefore, only the member 74 is described in detail. The end member 74 includes a bore 78 in line with the permanent magnet 66. Positioned within the bore 78 and spaced from the inner surface of the bore 78 is a cylinder member 80 of magnetic material. The cylinder 80 is supported adjacent the north pole of the permanent magnet 66 by the bracket assembly 70. The outer member 74 also includes a slot 82 in its lower surface for receiving a member 83 of magnetic material. The member 83 extends below the permanent magnet 66 and is supported by the frame members 70 and 72 to extend through the slot 82 and a similar slot in the member 76 to complete the magnetic field path from the permanent magnet 66.

Due to the arrangement of the end members 74 and 76 and the cylinders such as 80, substantially uniform radial magnetic fields are developed through air gaps between the bores and the inner cylindrical members.

In the magnetic field assembly, the end member 74 and the inner cylindrical member 80 comprise component elements of the position control system illustrated in the above-identified copending application while the end member 76 and its associated elements comprise component parts of the position control system. The structural arrangement associated with each position control system is substantially the same. Therefore, only the assembly associated with the position control system 26 including the end member 74 will be described in detail. The structural arrangement of such an assembly is illustrated most clearly in FIGURE 1.

As represented, the cylindrical inner body 80 is supported in the opening 78 and includes a V-shaped groove 84 extending longitudinally in a substantially horizontal plane along the upper surface of the cylinder in line with its longitudinal axis.

Positioned within the air gap between the cylindrical body 80 and the inner wall of the bore 78 is a tubular bobbin assembly 85. The bobbin 85 extends around the cylindrical body 80 and is shaped to receive a coil 86 wound about its outer surface (see FIG. 3). The coil 86 preferably corresponds to the coil 36 illustrated in the drawing of the above-identified copending application and is arranged to receive a current signal which, when passing through the magnetic field, develops opposing forces which, when unbalanced on the coil, impart linear motion to the coil-bobbin assembly within the magnetic field.

Such linear motion support is provided in part by a ball 88 (see FIGURE 5) positioned in the groove 84 to make rolling contact with an upper inner surface of the bobbin 85 and the sloping side walls of the V-shaped groove 84. Normally the ball 88 is centrally positioned along the groove 84 with the bobbin midway along the cylindrical body 80. Preferably, the width of the bobbin is more than one-half as great as the desired linear travel of the bobbin. As a consequence the ball 88 remains in rolling contact with the bobbin 85 during the complete to and fro travel of the bobbin 85 without contacting a pair of tabs 90 and 92 extending downwardly from the bobbin 85 to insure that the ball 88 does not escape from the groove 84. Thus, a substantially friction-free support is provided by the ball and groove arrangement to guide the bobbin 85 in a linear direction in response to an unbalance in forces developed on the coil wound around the bobbin.

The linear motion of the bobbin 85 is converted into rotary motion by a linear-to-rotary motion converter 93 coupled thereto. The linear-to-rotary motion converter comprises a shaft 94 supported by a vertical frame member 96 and a bracket 98 coupled to the frame member 96. The shaft 94 and its supporting structure is most clearly illustrated in FIGURE 6. The shaft 94, as illustrated, is supported in a horizontal plane with its longitudinal axis extending normal to the direction of linear travel of the bobbin 85. The shaft 94 is ball bearing mounted at 100 in an opening 102 in the frame 96 to extend therebeyond for coupling to a movable arm of a W linkage arrangement such as illustrated in the abovementioned copending application. An E ring 104 extends around the shaft adjacent the bearing arrangement 100 to limit longitudinal travel of the shaft in a relative left hand direction. An opposite end of the shaft 94 is bearing mounted at 106 in an opening of an L-shaped arm of the bracket 98. The end of the shaft 104 is threaded to receive a washer 110 and a nut 112. By tightening the nut 112 the bearing arrangements 100 and 106 are preloaded in the longitudinal direction of the shaft to prevent undesired lateral movement of the shaft 94.

The shaft 94 carries a pair of cable receiving drum members 114 and 116. The drums 114 and 116 are capable of substantially free rotation about the shaft 94 and are coupled thereto by adjustable screw members 118 and 120. By loosening the screw members 118 and 120 the drums 114 and 116 may be selectively positioned at any point along the shaft 94 between the forward extending arm of the bracket 98 and the support plate 96.

As illustrated in FIGURE 1, the shaft 94 is supported in a horizontal plane slightly below the horizontal center plane of the bobbin 94 including the central axis thereof. In particular, the upper surfaces of the drums 114 and 116 are tangent to the horizontal center plane and are laterally positioned on the shaft 94 in line with opposite sides of the bobbin 85.

To impart selective rotary motion to the shaft 94 in response to linear movement of the bobbin 85 as well as to aid in providing an extremely stable support for the linear movement of the bobbin 85, the linear-to-rotary motion converter 93, in its preferred form, includes a pair of side arm members 122 and 124 extending from opposite sides of the bobbin 85 at points slightly above the horizontal center plane of the bobbin. The arms 85 extend outward from an end surface of the bobbin 85 over and beyond the drums 114 and 116. The arrangement of the arms 122 and 124 relative to the bobbin 85 is most clearly illustrated in FIGURES 1 and 3.

Extending from a lower surface of the arms 122 and 124 adjacent the bobbin 85 are a pair of pins 126 and 128, respectively. The pins 126 and 128 provide means for securing cable arrangements 130 and 132, respectively. Means for securing opposite ends of the cable arrangements 130 and 132 is provided by a cross arm arrangement 134 which extends between and substantially normal to the ends of the arms 122 and 124. The cross arm 134 includes a pair of openings 136 and 138 in line with the pins 126 and 128, respectively. In particular, the openings 136 and 138 lie in vertical planes with the pins 126 and 128 substantially parallel to a central vertical plane including the V-shaped groove 84.

The cable arrangements 130 and 132 are substantially the same and are terminated in threaded studs 140 and 142, respectively. As illustrated, most clearly in FIGURE 4, the threaded studs, such as 142, are dimensioned to fit through the opening in the cross arm member 134 and receive a lock nut such as 144 to control the tension of the cable arrangement when looped around the associated pin. As represented for the cable arrangement 132, in the linear-to-rotary motion converter of the present invention, the cable 132 is looped around the pin 128 and extends in a substantially straight line therefrom away from the end of the bobbin 85. The cable 132 is looped once around the drum 116 to thread the loop. From the drum 116 the cable extends in a substantially straight line with stud being positioned in the opening 138. By tightening the lock nut 144, the stud is secured in the opening and a predetermined controllable amount of tension is developed to the cable 132. Since the upper surface of the drum 116 is tangent to the horizontal center plane of the bobbin including the pin 128 and the opening 138, the cable 132, in passing between the opening and the pin, lies in the horizontal center plane of the bobbin 85.

Preferably, the cable 132 in being thus looped around the drum, is secured thereto by a screw member 146 such that the portions of the looped cable 132 extending around the drum 116 travel in substantially straight lines parallel to the vertical plane of the pin during at least the first and last 90° of the wrap and with like portions of the cable being equally spaced on opposite sides of the vertical plane. A similar wrapping arrangement is provided for the cable 130 in combination with the drum 114. Since like portions of the cables 130 and 132 are equally spaced on opposite sides of vertical planes including the openings and the pins, longitudinal forces on the ends of the cables exert equal and opposite balancing lateral forces on shaft 94 through the drums 114 and 116. Thus, the cable arrangements of the present invention do not develop undesired rotation forces on the shaft 94 which would interfere with the efficiency of the linear-to-rotary motion conversion provided thereby.

In addition to providing a highly efficient conversion of linear-to-rotary motion, the particular cable arrangement of the present invention also aids in the support of the bobbin 85. In particular, the cable arrangement 130 and 132 lie about vertical planes in line with opposite sides of the bobbin 85. Further, the cables 130 and 132 make tangential contact with the drums 114 and 116 in passing therearound. By tensioning the cables 130 and 132 the upper tangential points of contact of the cables with the drums define points of support for the bobbin 85 at opposite sides thereof equally spaced from the vertical central axis of the bobbin. In this manner the cable and drum arrangements, together with the ball and groove, provide a three point support for the coil assembly to insure low friction linear movement of the bobbin 85 within the magnetic field in response to current signals applied to the coil wound around the bobbin.

Furthermore, the linear motion of the coil bobbin assembly within the magnetic field is substantially free of undesired backlash. This is due to the preloading of the ball bearing supports for the shaft 94 and the tensioning of the cables 130 and 132.

The motor drive assembly, as described, is relatively inexpensive and easy to implement and adjust. In particular, drums 114 and 116 are laterally adjustable along the shaft 94. The tension in the cables 130 and 132 is adjustable by tightening and untightening the lock nuts about the threaded studs 140 and 142, and the preloading of the shaft 94 is controllable by tightening and untightening the nut 112 against the ball bearing arrangement 106.

In addition, due to the balance of lateral forces imparted to the shaft 94 by each of the closed loop cable arrangements 130 and 132, the tensioning of the cables may be different without exerting undesired rotary forces on the drive shaft.

As previously described, the motor drive assembly of the present invention is particularly adaptable to use in a position control system such as that illustrated in the above-mentioned copending application. In such an arrangement a differential transformer is employed as a portion of closed feedback loop. A preferred assembly of such a differential transformer arrangement is illustrated in FIGURE 5.

As represented, the cylindrical body 80 includes a central bore 150. Positioned within the bore is a sleeve 152. Plug elements 154 and 156 having central openings therein are inserted in opposite ends of the sleeve 154. Supported within the sleeve 152 is a primary winding 158 and a pair of secondary windings 160 and 162. The leads from the windings extend through openings in the plug 156. The primary and secondary windings may correspond to the primary and secondary windings of the differential transformer 82 illustrated in the copending application identified above. Extending through the central openings in the plugs 154 and 156 is a rod 164. The rod 164 is coupled to the cross arm 134 and supports a probe of magnetic material 166 within the sleeve 152 spaced from the primary and secondary windings. Movement of the bobbin 85 imparts linear movement to the probe 166 through the cross arm 134 and the rod 164. As previously described, such movement of the probe varies the magnetic coupling between the primary and secondary windings to amplitude modulate the electrical signals induced in the secondary windings as a function of the position of the coil relative to a reference position.

Figure 5:
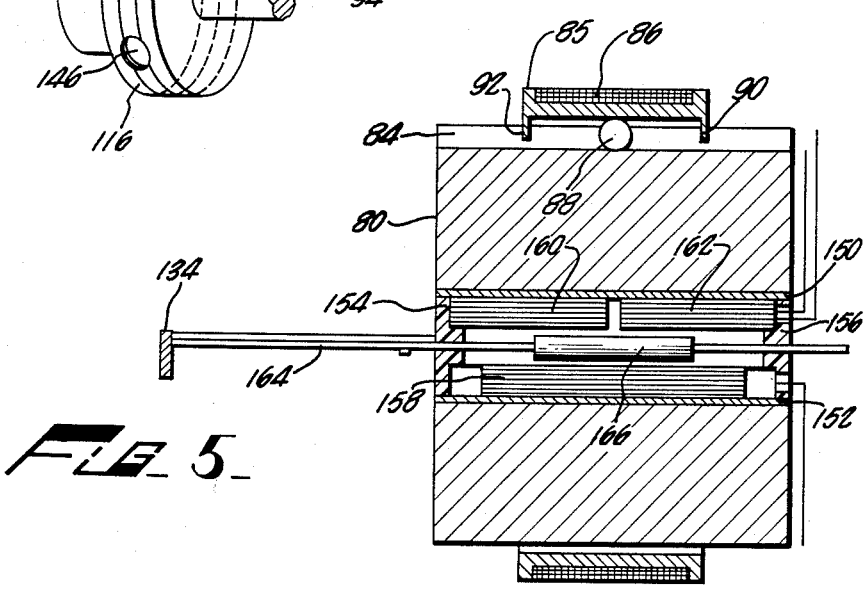
FIGURE 5 is a cross sectional representation of the coil-bobbin assembly illustrating a portion of the position control system.
Figure 6:
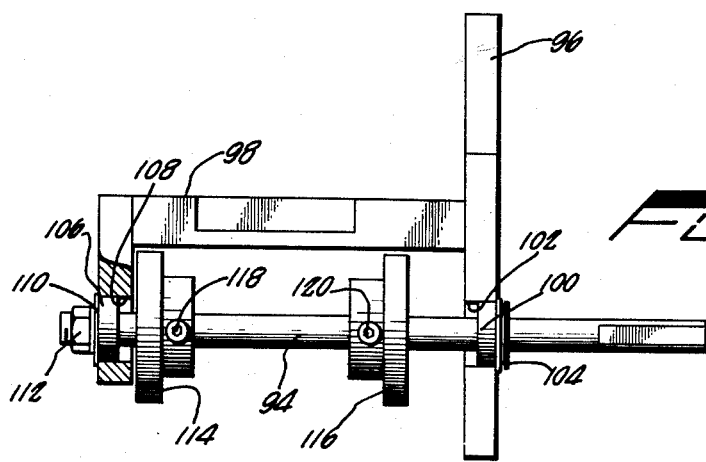
FIGURE 6 is a schematic representation of the support arrangement for the rotatable shaft.

The assembly of FIGURE 5 allows the differential transformer to be embedded within a body of magnetic material and provides a highly compact and efficient differential transformer arrangement for use in the position control system referred to.

What is claimed is:
1. In a motor drive assembly, the combination of:
means for developing a magnetic field including a body of magnetic material;
means defining a track extending in a substantially horizontal plane along an upper surface of the body;
a hollow movable bobbin assembly dimensioned to extend around the body;
a coil wound around the bobbin assembly for receiving a current signal;
means supporting the bobbin assembly for movement in the direction of the track including a ball positioned in the track to make rolling contact with an upper inner surface of the bobbin assembly;
a rotatable shaft mounted in a horizontal plane substantially normal to the direction of the movement of the bobbin assembly;
first and second cable arrangements;
and support means extending from the bobbin assembly for securing the cables under tension to extend in substantially straight lines from areas in a horizontal plane spaced on either side of a vertical plane including the track away from an end of the bobbin around the shaft and to areas in the horizontal plane.

2. In a motor assembly, the combination of:
means for developing a magnetic field including a body of magnetic material having a groove extending longitudinally in a substantially horizontal plane along an upper surface of the body;
a hollow movable bobbin dimensioned to extend around the body;
a coil wound around the bobbin for receiving a current signal;
means supporting the bobbin for movement in the direction of the groove including a ball positioned in the groove to make rolling contact with an upper inner surface of the bottom;
a rotatable shaft mounted in a horizontal plane substantially normal to the direction of movement of the bobbin;
and support means extending from the bobbin for securing the cables to extend in substantially straight lines from areas in a horizontal center plane of the bobbin spaced from a vertical plane including the groove away from the bobbin around the shaft and to areas in the horizontal center plane.

3. In a motor drive assembly, the combination of:
means for generating a magnetic field including a body of magnetic material having a V-shaped groove extending longitudinally in a substantially horizontal plane along an upper surface of the body;
a hollow movable bobbin dimensioned to extend around the body;
a coil wound around the bobbin for receiving a current signal;
means supporting the bobbin for movement in the direction of the groove including a ball positioned in the groove to make rolling contact with an upper inner surface of the bobbin and the sides of the groove;
a rotatable shaft mounted in a horizontal plane substantially normal to the direction of the movement of the bobbin;
first and second closed loop cable arrangements;
and support means extending from the bobbin for securing the cables to extend in substantially straight lines from areas in the horizontal center plane of the bobbin equally spaced from a vertical center plane including the groove away from an end of the bobbin around the shaft to thread the cable loops and to areas in the horizontal center plane equally spaced from the vertical center plane.

4. The apparatus defined in claim 3 including means for selectively controlling the tension in the first and second cable arrangements.

5. The apparatus defined in claim 3 including means coupled to the shaft for adjusting the lateral position of the rotatable shaft.

6. The apparatus defined in claim 3 including means for securing the cables to the shafts such that like portions of the cables passing around the shaft are equally spaced from vertical planes in line with the areas in the horizontal center plane.

7. A linear-to-rotary motion converter comprising a shaft mounted for rotation about a horizontal axis, a reciprocable member disposed adjacent the shaft and mounted for movement in a horizontal plane along a line normal to the shaft axis, an arm secured to the reciprocable member and extending therefrom to beyond the shaft, and a closed loop cable arrangement connected to the arm adjacent the reciprocable member and extending in tension circumferentially around the shaft to connection with the arm at a location disposed on the opposite side of the shaft from the reciprocable member, the cable arrangement defining a pair of equal length strands between the connections thereof to the arm, each strand in passing around the shaft being spaced the same distance from a vertical plane passing through the connections of the cable arrangement to the arm as the other strand is spaced from the opposite side of the vertical plane.

8. A linear-to-rotary motion converter, comprising:
a rotatable shaft mounted in a horizontal plane;
first and second closed loop cable arrangements;
and support means mounted for linear movement in a horizontal plane and including means extending from one side of the shaft to an opposite side of the shaft for securing the cable arrangements to extend in substantially straight lines from first areas spaced apart along the shaft in a common horizontal plane tangent to the shaft and around the shaft to thread the cable loops and to second areas in the common horizontal plane on the opposite side of the shaft from the first areas such that the cables in passing around the shaft are equally spaced from vertical planes in line with associated ones of the areas in the common horizontal plane.

9. In a motor drive assembly, the combination of:
means for developing a substantially radial magnetic field including the cylindrical body of magnetic material having a V-shaped groove extending longitudinally in a substantially horizontal plane in line with a central axis of the body along an upper surface of the cylindrical body;
a tubular movable bobbin dimensioned to extend around the body;
a coil wound around the bobbin for receiving a current signal;
means supporting the bobbin for movement in the direction of the groove including a ball positioned in the groove to make rolling contact with an upper inner surface of the bobbin and the sloping sides of the V-shaped groove;
a rotatable shaft mounted in a horizontal plane normal to the direction of movement of the bobbin;
first and second closed loop cable arrangements;
first and second arm members extending in a substantially horizontal plane from opposite sides of the bobbin substantially parallel to the groove;
and means coupled to the first and second arms for securing the first and second closed loop cable arrangements, respectively, to extend under tension in substantially straight lines from areas adjacent the bobbin in a horizontal center plane of the bobbin equally spaced from a vertical center plane including the groove away from the bobbin around the shaft to thread the cable loops and to areas in the horizontal center plane remote from the bobbin and equally spaced from the vertical center plane.

10. The apparatus defined in claim 9 including stop means coupled to the bobbin at opposite ends of the groove.

References Cited in the file of this patent
UNITED STATES PATENTS

| | | |
|---|---|---|
| 497,706 | Chase et al. | May 16, 1893 |
| Re. 25,266 | Anderson | Oct. 16, 1962 |